United States Patent
Johnson

[11] Patent Number: 6,021,268
[45] Date of Patent: Feb. 1, 2000

[54] METHOD AND APPARATUS FOR MODELING RECEIVER BANDWIDTH FOR TELECOMMUNICATIONS ANALYSIS

[75] Inventor: Thomas M. Johnson, Royersford, Pa.

[73] Assignee: Analytical Graphics, Inc., Malvern, Pa.

[21] Appl. No.: 08/915,971

[22] Filed: Aug. 21, 1997

[51] Int. Cl.⁷ .................................................. G06F 17/00
[52] U.S. Cl. .............................. 395/500.24; 395/500.25
[58] Field of Search ........................... 364/578; 455/257, 455/266; 395/500.24, 500.25

[56] References Cited

U.S. PATENT DOCUMENTS

| | | | |
|---|---|---|---|
| Re. 32,905 | 4/1989 | Baran | 370/104 |
| 4,339,828 | 7/1982 | Chasek | 455/205 |
| 4,734,856 | 3/1988 | Davis | 364/300 |
| 5,020,092 | 5/1991 | Phillips et al. | 379/59 |
| 5,208,829 | 5/1993 | Soleimani et al. | 375/1 |
| 5,268,712 | 12/1993 | Hilpert et al. | 358/192.1 |
| 5,479,447 | 12/1995 | Chow et al. | 375/260 |
| 5,548,539 | 8/1996 | Vlach et al. | 364/578 |
| 5,557,320 | 9/1996 | Krebs | 348/12 |
| 5,566,301 | 10/1996 | Koz et al. | 395/200.2 |
| 5,621,416 | 4/1997 | Lennen | 342/357 |
| 5,638,363 | 6/1997 | Gittins et al. | 370/358 |

FOREIGN PATENT DOCUMENTS

| | | |
|---|---|---|
| 0 651 531 | 5/1995 | European Pat. Off. |
| 0 731 573 | 9/1996 | European Pat. Off. |
| 92/22162 | 12/1992 | WIPO |

OTHER PUBLICATIONS

Textbook 'Information Transmission, Modulation, and Noise', Mischa Schwartz, McGraw–Hill Pub Co., Chapter 6 TOC and pp. 408–410, 4th Ed.

*Primary Examiner*—Kevin J. Teska
*Assistant Examiner*—Lonnie A Knox
*Attorney, Agent, or Firm*—Roberts Abokhair & Mardula LLC

[57] ABSTRACT

A method for the automatic scaling of radio receiver characteristics. Receiver designs are subject to change based upon the parameters of transmitters and the desired characteristics of communications links in a communications system. The method of the present invention involves automatically scaling the characteristics of a receiver based upon the transmitter proposed and the desired characteristics of a communications link. Auto-scaling calculates the bandwidth necessary for the receiver based upon the transmitter proposed. Information concerning the modulation type and the scaling factor associated with each modulation type are stored in a database for access by the system. Once transmitter characteristics are known, receiver characteristics are automatically calculated. The system allows for multiple designs to be created so that analysts can select the optimal design for the mission. The system also allows for animated soft copy output of maps, reports and graphs to be created as well as allowing for hard copy output of reports graphs.

21 Claims, 3 Drawing Sheets

METHOD AND APPARATUS FOR MODELING RECEIVER BANDWIDTH FOR TELECOMMUNICATIONS ANALYSIS

FIELD OF THE INVENTION

The present invention relates generally to the analysis, design and planning of telecommunications systems. In particular, the invention relates to a method and apparatus to model the bandwidth of a receiver in a telecommunications link to automatically scale the receiver bandwidth to take account of the varying data rates and modulation types of one or more transmitters in the system.

BACKGROUND OF THE INVENTION

The optimal functioning of a receiver in a telecommunications system depends upon, among other things, the compatibility of its receiving bandwidth with the data rate and modulation type of the transmitter that is the source of the signal. In an analysis of communications links, an incorrect setting of the receiving bandwidth can lead to erroneous conclusions about transmitter requirements. For example, in a computer analysis of the communications link between a satellite transmitter and a ground station receiver, it may be important to determine how much transmitter power is needed to achieve a given bit error rate. If the bandwidth setting for the receiver is incorrect, the predicted power requirement may be too low, in which case the communications system may fail because of insufficient power. In contrast, if the predicted power requirement is too high, the satellite may be burdened with unnecessary weight resulting from a more powerful transmitter being used in the space craft.

For example, a new Earth Resource satellite, whose mission requires it to transmit a given number of pictures daily to ground-based receivers is to be built. This requires achieving a given data rate, which, in conjunction with the transmitter's modulation type, would determine the optimal bandwidth for the receiver.

In a computer analysis of this case, it is desirable to be able to modify and test various transmitter parameters in order to arrive at the most efficient and economical configuration. However, changes in these parameters—e.g., in the modulation type—require corresponding changes in the receiving bandwidth. If the latter changes are not made, the analysis will result in errors with potentially expensive consequences. If a satellite with insufficient transmitter power is launched, the error cannot be corrected and the satellite will be useless for its intended purpose.

In a communications link analysis without the present invention, it is necessary to adjust the receiver's bandwidth setting each time there is a change in the transmitter parameters affecting bandwidth ratio: Alternatively, one can set up a separate receiver for each different bandwidth setting that may be required. Both of these alternatives are time consuming and do not allow a wide range in transmitter parameters to be tested. More seriously, reliance on such measures entails a significant risk of error.

To overcome the shortcomings of the above approach, a method and apparatus are needed that will adjust the bandwidth setting of the receiver in a computer analysis of communications links automatically taking into account the changes in transmitter parameters affecting bandwidth ratio. Such a method and apparatus will provide the user with a bandwidth autoscaling option that can be used in lieu of setting the receiving bandwidth manually. The auto-scaling capability would take into account such transmitter parameters as data rate and modulation type, and set the receiving bandwidth to the correct frequency range, thereby allowing design of the optimal transmitter.

SUMMARY OF THE INVENTION

It is therefore an object of the present invention to provide a method and apparatus to ensure that a receiver is set to the correct bandwidth, given the data rate and modulation type of the transmitter that is the source of the signal.

It is a further objective of the present invention to provide method and apparatus to ensure that a receiver in a computer analysis of telecommunications links among satellites, or between satellites and Earth stations, is set to the correct bandwidth, given the data rate and modulation type of the transmitter that is the source of the signal.

It is a further objective of the present invention to allow receiver parameters to be modeled graphically to provide visual feedback to the designer of the parameters chosen.

It is yet another objective of the present invention to provide visual feedback to the designer, in animated form, showing the performance of the transmitter and receiver combination specified.

It is a further objective of the present invention to provide an auto scaling function whereby the correct parameters of the receiver are created automatically based upon the characteristics of the transmitter in question and other system component characteristics.

In its preferred embodiment, the present invention is a feature of a communications module integrated into an existing computer program for satellite systems analysis. The present invention allows the user to model a satellite systems analysis scenario by using a graphical user interface to specify basic and graphics properties of objects in the scenario (such as satellites, facilities, sensors, targets, etc,) and imposing constraints on those objects. The program presents an animated visual display of the scenario (on a world map window) and provides analysis results in the form of reports and graphs. The communications module adds two further types of objects—transmitters and receivers—to the program and allows the user to model their properties, behavior and limitations.

When analyzing potential transmitter/receiver combinations, the user specifies the basic properties of a receiver such as bandwidth. The user can set the bandwidth of the receiver manually or select the Auto Scale option. If the Auto Scale option is selected, the bandwidth of the receiver is determined automatically on the basis of the data rate and modulation type of each transmitter included in the analysis. The bandwidth desired is calculated based upon the scaling factor for the modulation in question times the data rate. Thus, the link between each transmitter and the receiver is analyzed as if the receiver were set for the bandwidth most appropriate to the given transmitter's settings. As a result, one receiver object in the scenario may have several different bandwidth settings, depending on which transmitter is the focus of the particular analysis. This auto scaling ability not only speeds the analysis process, but also eliminates human error.

The present invention operates on an IBM PC or compatible having at least a Pentium processor with 16 MB of RAM (32 MB recommended) and 220 MB of Disk space. The present invention will also operate on various UNIX platforms such as the Sun/Solaris 2.4 and 2.5, the Sun OS 4.1.3, Hewlett Packard UX 9.07, Silicon Graphics IRIX 5.3 and 6.3, DEC Unix 3.0 and higher, and IBM AIX 4.2. The present invention also comprises input and output means so that data can be input to the program specifying the transmitter. The typical input means is a keyboard although other input means such as mouse and voice input are also contemplated.

As previously noted, the output to the analyst can be in the form of a video display including animated maps, reports and graphs, and/or in the form of hard copy. Such hard copy output also includes printouts of maps, reports and graphs.

The equipment of the present invention also comprises logic whereby the scaling of the receiver based upon the transmitter characteristics can take place. For example, a database of modulation types is present together with an associated scaling factor. This is used in conjunction with the input of a data rate to calculate the bandwidth necessary for the receiver.

BRIEF DESCRIPTION OF THE INVENTION

FIG. 1. Current Method of Receiver Scaling

FIG. 2. Present Invention Method of Receiver Scaling

FIG. 3. The Equipment of the Present Invention.

DETAILED DESCRIPTION OF THE PRESENT INVENTION

Figure 1:
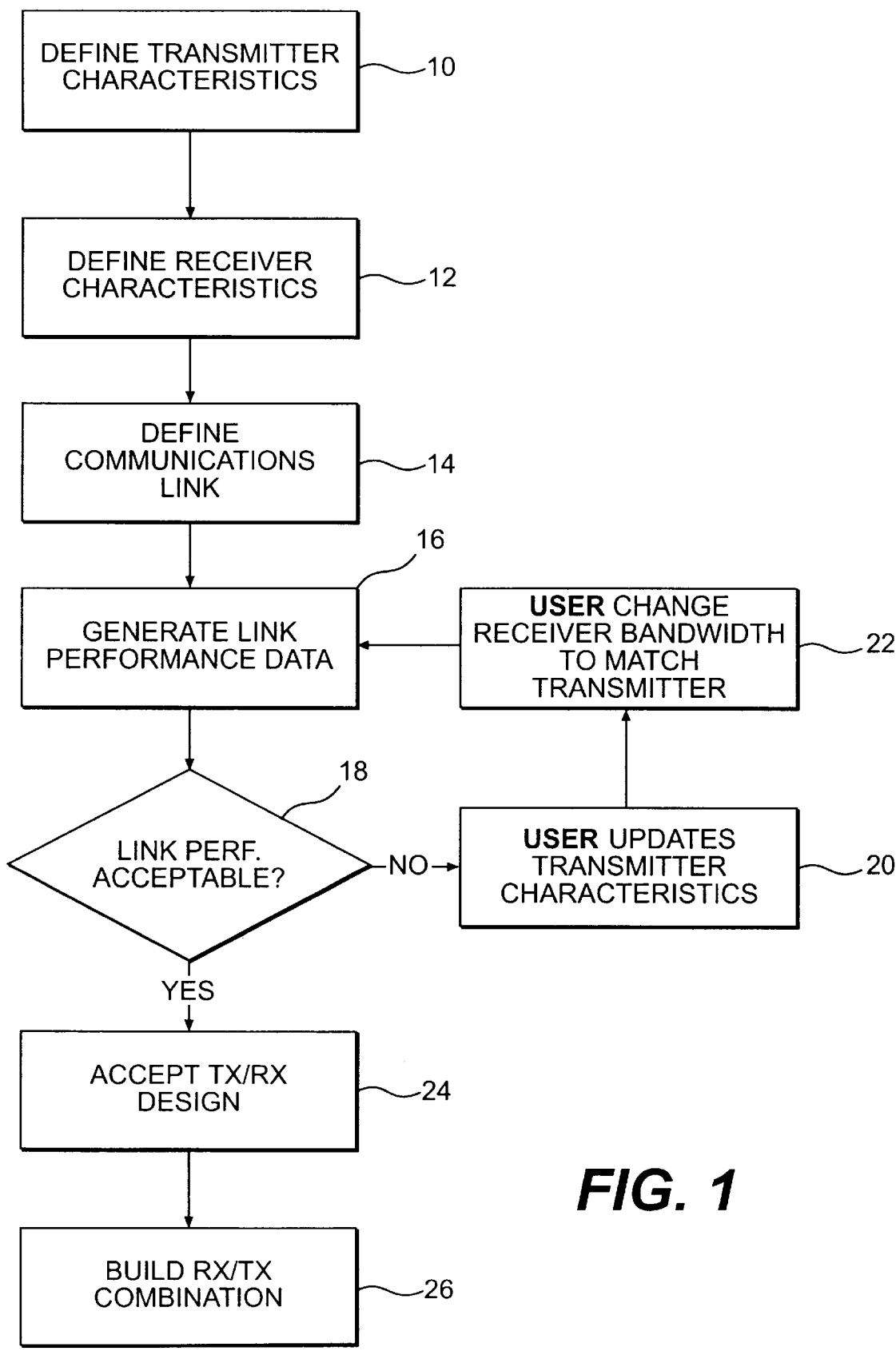

Referring to FIG. 1, the process flow for receiver bandwidth determination is shown. The user first defines the transmitter characteristics 10. These characteristics comprise the power of the transmitter, antenna type and size, miscellaneous gains and losses, modulation and data rate, and other factors.

The user next defines the receiver characteristics, including a fixed bandwidth of the receiver 12. Such receiver characteristics include signal-to-noise ratio required, bandwidth fluctuations and controls, antenna type, noise figure and other factors.

After defining transmitter and receiver for characteristics, the user defines a communications link from the transmitter to the receiver 14.

After definition of communications link, the user generates link performance data 16, comprising such information as the signal-to-noise ratio of the link, bit-error-rate and carrier-to-noise ratio based upon transmitter, receiver, and communications link characteristics. This data is then analyzed to determine if the transmitter/receiver combination over the communications link operates as desired 16. Predefined thresholds for the communications link parameters are set.

If performance data is acceptable, the design for the receiver and transmitter is accepted 18.

If the link performance is unacceptable, the user must then update the transmitter 20 and receiver characteristics 22.

After updating the transmitter characteristics, it may be necessary for the user to change the receiver bandwidth to match the transmitter changes 22 (if the modulation type and data rate are changed). This is based upon a re-calculation of the product of the scaling factors and data rate for the transmitter in question. This is a critical step since if the receiver bandwidth characteristics are not changed or are changed incorrectly, the results and the analysis of the communications link performance will be incorrect. The user then generates link performance data again 16 and again determines if link performance is acceptable 18.

If the transmitter/receiver combination is acceptable, the design is accepted 24 and the receiver/transmitter combination is then fabricated to 26.

A key difficulty with the existing procedures is that altering the receiver bandwidth to match transmitter changes is not a trivial task. It involves consideration of a number of factors such as communications link factor tradeoffs and transmitter characteristics, and shape of the power spectrum of the transmitted signal. If this step is not done correctly, then subsequent results of receiver/transmitter combinations, will be incorrect, resulting in costly design and construction difficulties, not to mention a potential compromise of mission objectives.

Figure 2:
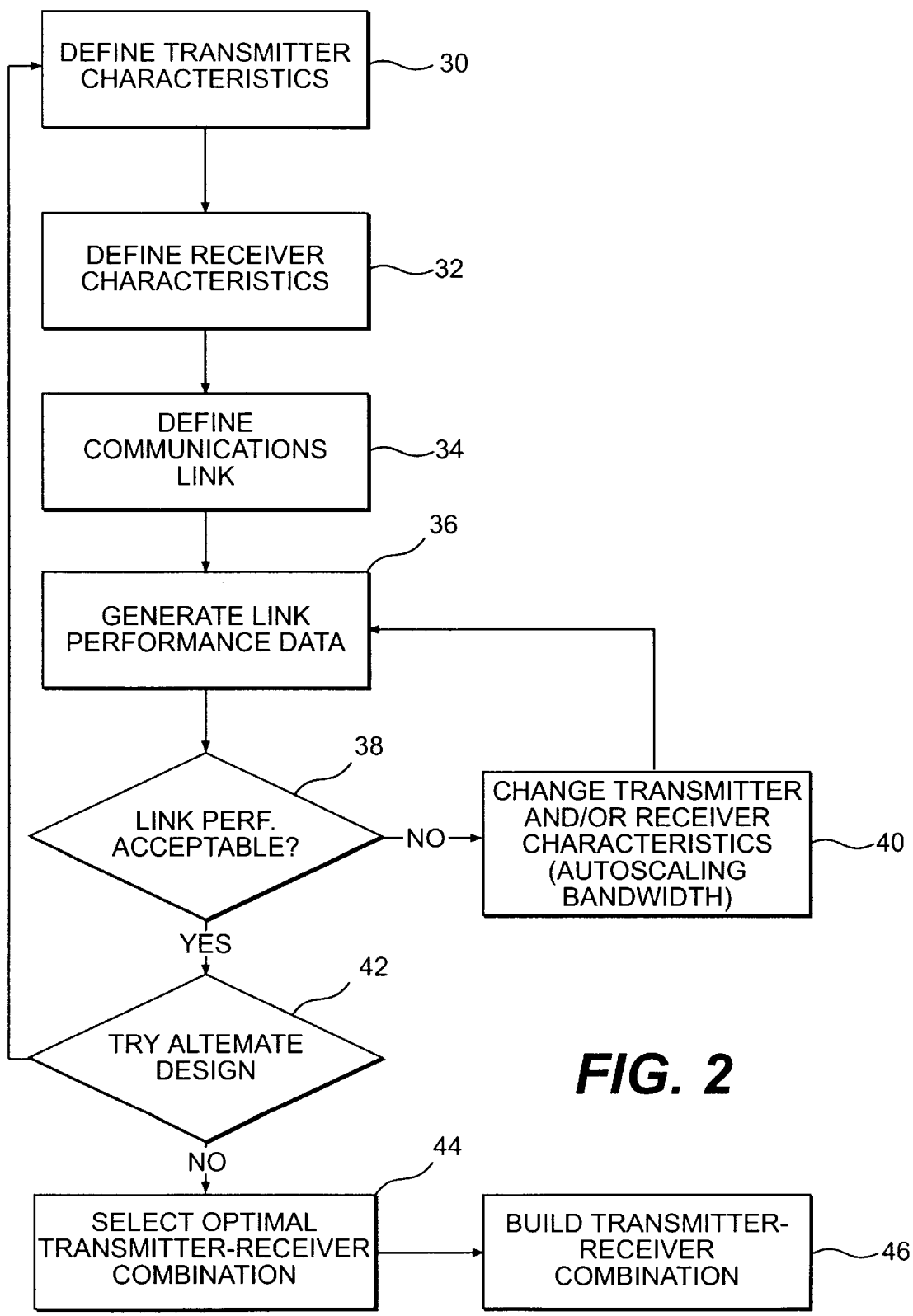

Referring to FIG. 2, the process of the present invention is described. The user defines transmitter characteristics 30, and defines receiver characteristics 32 autoscaling the bandwidth of the receiver on the basis of the data rate and modulation type of the transmitter. The user then evaluates the performance of the communications link 34, generating link performance data 36, and determining if the link performance is acceptable 38. If performance is not acceptable, the user updates the transmitter and/or receiver parameters 40, again auto-scaling the receiver's bandwidth to reflect any changes in the data rate and/or modulation type of the transmitter. After making such adjustments, the user reevaluates the communications link performance 36,38. If the performance data is acceptable 38, the user decides whether to try an alternative receiver transmitter design 42. If the user decided not to try an alternative design, then the user selects from among the designs that have performed acceptably 44 and proceeds to the fabrication phase 46. Following this procedure, the user may experiment with a wide variety of transmitter and receiver parameters in search of the optimal combination, without having to adjust receiver bandwidth every time there is a change in the transmitter's data rate and/or modulation type. In this way potential errors are avoided.

Figure 3:
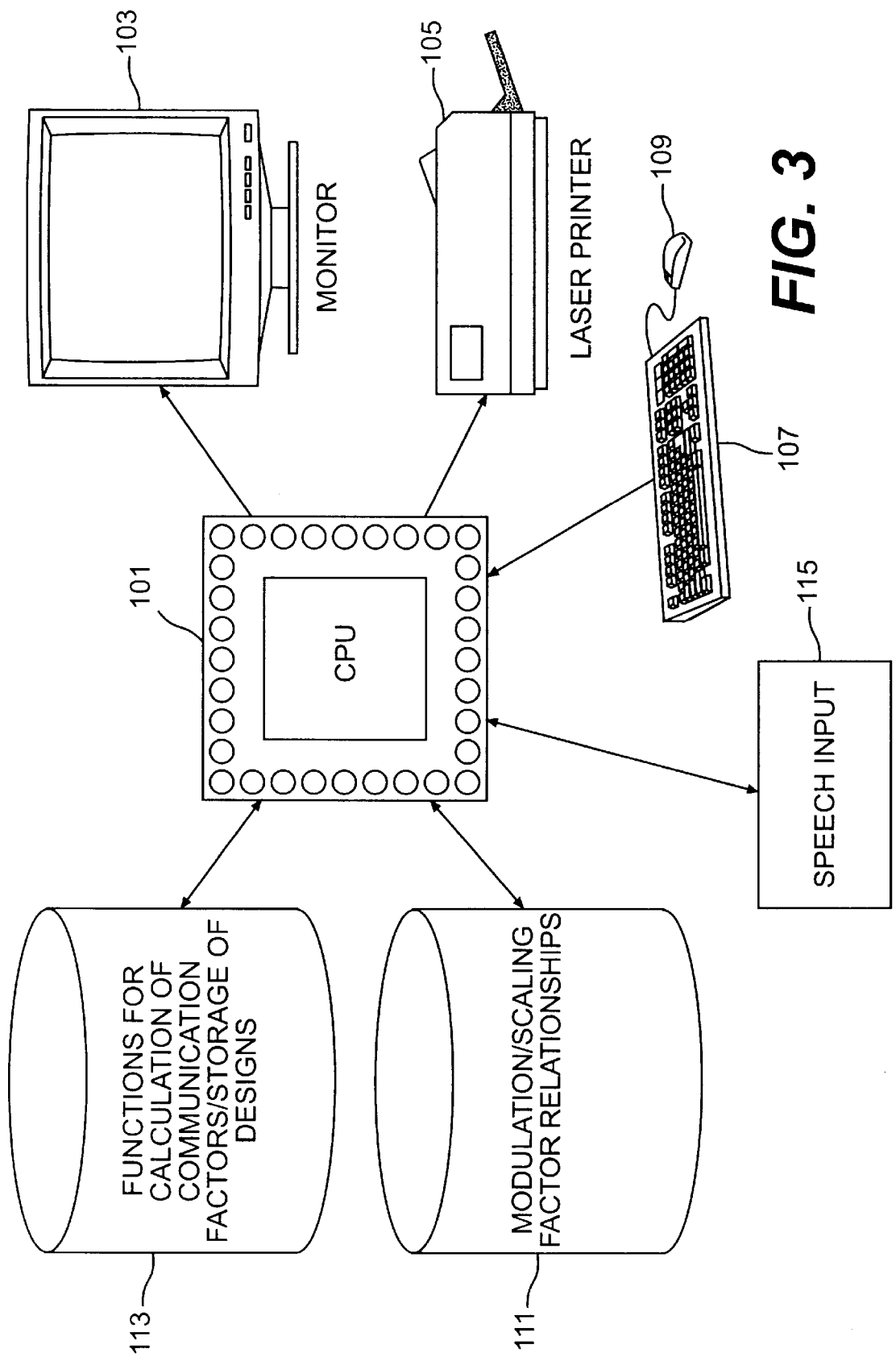

Referring to FIG. 3, the equipment of the present invention is described. Central processing unit (CPU) 101 comprises RAM memory in which logic may be stored to perform the analysis of the present invention. Instructions concerning the scaling of the receiver characteristics are executed by the CPU. Using input means typically a keyboard 107 and mouse 109, characteristics of a transmitter are input. This input can be either in the form of input of specific characteristics manually or as selected characteristics from a database of transmitter characteristics 113. It is also contemplated that speech input and instruction to the computer may also be used 115.

Once the transmitter characteristics are input, the CPU 101 can obtain information on the relationship of modulation type to scaling factor from a database of such relationships 111. Using the scaling factor information from the database 111 and the data rate input by the user, the bandwidth of the receiver can be calculated by the CPU 101 and output to a video display 103 or to hard copy 105 for further analysis.

A method for autoscaling the parameters of a receiver based upon communications link requirements and characteristics of a transmitter has been shown. Those skilled in the art will appreciate that there are alternatives for the autoscaling of receiver design without departing from the spirit of the invention as shown.

I claim:

1. A method for auto-scaling satellite receiver characteristics wherein the method is incorporated into a satellite system analysis computer program for design selection comprising:

(a) defining first transmitter characterstics;
(b) automatically defining first receiver characteristics based upon the first transmitter characteristics;
(c) defining the communications link between the first transmitter and first receiver;
(d) generating first communication link performance data;
(e) determining acceptability of the first communications link performance;
(f) creating second transmitter characteristics when first communication link performance is unacceptable;
(g) automatically creating second receiver characteristics based upon the second transmitter and second receiver characteistics;
(h) generating second communications link performance data based upon the second transmitter and second receiver characteristics;
(i) determining acceptability of the second communications link performance; and
(j) accepting the revised transmitter add revised receiver characteristics when link performance data is acceptable.

2. The method for auto-scaling satellite receiver characteristics wherein the method is incorporated into a satellite system analysis computer program for design selection of claim 1 wherein the first transmitter characteristics comprise data rate and modulation type.

3. The method for auto-scaling satellite receiver characteristics wherein the method is incorporated into a satellite system analysis computer program for design selection of claim 1 wherein the first receiver characteristics comprise bandwidth.

4. The method for auto-scaling satellite receiver characteristics wherein the method is incorporated into a satellite system analysis computer program for design selection of claim 1 wherein defining the first communications link comprises defining signal-to-nose ratio, bit error rate, and carrier to noise ratio.

5. The method for auto-scaling satellite receiver characteristics wherein the method is incorporated into a satellite system analysis computer program for design selection of claim 1 wherein generating first communications link performance comprises calculating the signal to noise ratio, the bit error rate, and the carrier to noise ratio of the first communications link using the first transmitter and first receiver characteristics.

6. The method for auto-scaling satellite receiver characteristics wherein the method is incorporated into a satellite system analysis computer program for design selection of claim 1 wherein determining acceptability of the first communications link performance comprises comparing first communications link performance data to desired thresholds and accepting the first receiver and first transmitter combination when performance thresholds are met and rejecting the first receiver and first transmitter combination when performance thresholds are not met.

7. The method for auto-scaling satellite receiver characteristics wherein the method is incorporated into a satellite system analysis computer program for design selection of claim 1 wherein the second transmitter characteristics comprise data rate and modulation and data rate.

8. The method for auto-scaling satellite receiver characteristics wherein the method is incorporated into a satellite system analysis computer program for design selection of claim 1 wherein the second receiver characteristics comprise bandwidth.

9. The method for auto-scaling satellite receiver characteristics wherein the method is incorporated into a satellite system analysis computer program for design selection of claim 8 wherein the second receiver bandwidth is calculated by multiplying the scaling factor for the modulation type of the second transmitter by the data rate of the second transmitter.

10. The method for auto-scaling satellite receiver characteristics wherein the method is incorporated into a satellite system analysis computer program for design selection of claim 1 further comprising defining alternative transmitter receiver combinations.

11. The method for auto-scaling satellite receiver characteristics wherein the method is incorporated into a satellite system analysis computer program for design selection of claim 10 further comprising selecting the optimal transmitter and receiver combination.

12. The method for auto-scaling satellite receiver characteristics wherein the method is incorporated into a satellite system analysis computer program for design selection of claim 11 further comprising building the accepted transmitter/receiver combination.

13. A system for auto-scaling satellite receiver characteristics wherein the system is incorporated into a satellite system analysis computer program for design selection comprising:
input means for specifying transmitter parameters;
a central processing unit (CPU) connected to the input means for receiving transmitter parameters from the input means;
random access memory resident in the CPU for storing instructions;
instructions stored in the random access memory for manipulating the transmitter data to arrive at receiver characteristics and whereby the instructions cause the receiver characteristics to be automatically generated from the transmitter characteristcs;
a modulation and scaling factor database connected to the CPU for storing information on transmitter modulation and associated scaling factors;
a communication factor database for storing factors relating to a desired communications link; and
output means for presenting the receiver characteristics to an analyst.

14. The system for auto-scaling satellite receiver characteristics wherein the system is incorporated into a satellite system analysis computer program for design selection of claim 13 wherein the input means is a keyboard.

15. The system for auto-scaling satellite receiver characteristics wherein the system is incorporated into a satellite system analysis computer program for design selection of claim 13 wherein the input means is a voice recognition system.

16. The system for auto-scaling satellite receiver characteristics wherein the system is incorporated into a satellite system analysis computer program for design selection of claim 13 wherein the modulation and scaling factor database further comprises at least a plurality of transmitter modulation types and a scaling factor associated with each transmitter modulation type.

17. The system for auto-scaling satellite receiver characteristics wherein the system is incorporated into a satellite system analysis computer program for design selection of claim 13 wherein the communication factor database further comprises at least a plurality of desired data rates, signal-to-noise ratios, bit-error-rates, and carrier-to-noise ratios.

18. The system for auto-scaling satellite receiver characteristics wherein the system is incorporated into a satellite system analysis computer program for design selection of claim 13 wherein the instructions stored in the random access memory multiply the scaling factor by the desired data rate to determine the receiver characteristics.

19. The system for auto-scaling satellite receiver characteristics wherein the system is incorporated into a satellite system analysis computer program for design selection of claim 18 wherein the receiver characteristics comprise at least bandwidth.

20. The system for auto-scaling satellite receiver characteristics wherein the system is incorporated into a satellite system analysis computer program for design selection of claim 13 wherein the output means is a hard copy selected from the group consisting of maps, reports and graphs.

21. The system for auto-scaling satellite receiver characteristics wherein the system is incorporated into a satellite system analysis computer program for design selection of claim 13 wherein the output means is a video display for displaying output selected from the group consisting of animated output, maps, reports, and graphs.

* * * * *